United States Patent
Klein

(10) Patent No.: US 7,346,790 B1
(45) Date of Patent: Mar. 18, 2008

(54) REMOTE POWER CYCLING OF PERIPHERAL DATA STORAGE SYSTEM

(75) Inventor: Barry L. Klein, Trabuco Canyon, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 442 days.

(21) Appl. No.: 10/816,545

(22) Filed: Mar. 31, 2004

(51) Int. Cl.
*G06F 1/26* (2006.01)

(52) U.S. Cl. .................... 713/320; 713/300

(58) Field of Classification Search ............. 713/310, 713/320, 324, 330; 365/145, 226
See application file for complete search history.

(56) References Cited

U.S. PATENT DOCUMENTS

| | | |
|---|---|---|
| D308,515 S | 6/1990 | Stead |
| D308,517 S | 6/1990 | Horie |
| D309,294 S | 7/1990 | Sottsass |
| D313,015 S | 12/1990 | Ryan et al. |
| D335,489 S | 5/1993 | Sander |
| 5,263,668 A | 11/1993 | Reiter |
| 5,276,865 A * | 1/1994 | Thorpe .................. 714/24 |
| 5,388,792 A | 2/1995 | Hastings et al. |
| D358,581 S | 5/1995 | Daniels |
| 5,469,573 A * | 11/1995 | McGill et al. ............. 717/127 |
| D365,331 S | 12/1995 | Martin et al. |
| D366,464 S | 1/1996 | Martin |
| 5,657,455 A | 8/1997 | Gates et al. |
| 5,749,637 A | 5/1998 | McMahan et al. |
| 5,754,112 A | 5/1998 | Novak |
| 5,815,652 A * | 9/1998 | Ote et al. .................. 714/31 |
| 5,887,962 A | 3/1999 | Tsai |
| 6,049,885 A * | 4/2000 | Gibson et al. ............. 713/324 |
| 6,059,384 A | 5/2000 | Ho |
| 6,176,461 B1 | 1/2001 | Beaman et al. |
| 6,311,941 B1 | 11/2001 | Feldmeyer |
| 6,374,363 B1 * | 4/2002 | Wu et al. .................. 714/6 |

(Continued)

FOREIGN PATENT DOCUMENTS

JP 03-232012 * 10/1991

(Continued)

OTHER PUBLICATIONS

Hard Disk Info—The Storage Authority, "Freecom FHD-1—The Intelligent Solution"; May 28, 2002.*

*Primary Examiner*—Chun Cao
(74) *Attorney, Agent, or Firm*—Brian E. Jones, Esq.; Howard H. Sheerin, Esq.

(57) ABSTRACT

A method for remotely power cycling a peripheral data storage system (PDSS) from a host system. The method comprises powering-up the PDSS from the host system based on a host-scheduled backup operation; transmitting pre-selected data to the PDSS from the host system based on the host-scheduled backup operation; and powering-down the PDSS from the host system based on the host-scheduled backup operation. Another method is for operating a PDSS for use with a host system configured to perform scheduled backup operations to the PDSS, the PDSS comprising a peripheral data storage device, a PDSS controller, and a peripheral data storage controller host interface adapted for communication with the host system. The method comprises powering-up the PDSS based on a host-scheduled backup operation; receiving data from the host system for storing in the peripheral data storage device; and powering-down the PDSS based on the host-scheduled backup operation.

37 Claims, 3 Drawing Sheets

U.S. PATENT DOCUMENTS

| | | |
|---|---|---|
| 6,439,528 B1 | 8/2002 | Goto et al. |
| 6,688,708 B1 | 2/2004 | Janson |
| 6,892,288 B2 * | 5/2005 | Serichol Blasco .......... 711/161 |
| 7,013,336 B1 | 3/2006 | King |
| 7,058,662 B2 * | 6/2006 | Wiggins et al. ............. 707/200 |
| 7,114,067 B2 | 9/2006 | Sukigara |
| 7,117,276 B2 | 10/2006 | Maeda et al. |
| 2003/0163627 A1 | 8/2003 | Deng et al. |
| 2004/0010732 A1 * | 1/2004 | Oka ........................... 714/13 |
| 2004/0044649 A1 * | 3/2004 | Yamato et al. ................. 707/1 |
| 2004/0136224 A1 * | 7/2004 | Hamer et al. ............... 365/145 |
| 2004/0143684 A1 | 7/2004 | Cheng |
| 2005/0015477 A1 * | 1/2005 | Chen .......................... 709/223 |
| 2005/0044220 A1 | 2/2005 | Madhaven |
| 2005/0091425 A1 * | 4/2005 | Wyatt et al. ................... 710/33 |
| 2005/0128626 A1 | 6/2005 | Suzuki et al. |
| 2005/0160213 A1 | 7/2005 | Chen |
| 2006/0277433 A1 * | 12/2006 | Lagman et al. ............... 714/15 |

FOREIGN PATENT DOCUMENTS

WO     WO 2004/23262 A2     3/2004

* cited by examiner

REMOTE POWER CYCLING OF PERIPHERAL DATA STORAGE SYSTEM

This invention relates to peripheral data storage systems. More particularly, the present invention is directed to a method for remote power cycling of peripheral data storage systems.

BACKGROUND OF THE INVENTION

External peripheral data storage systems such as external disk drives and card readers are standalone units that are commonly mounted to and communicate with a host computer, generally via an external cable such as a universal serial bus (USB) cable or Firewire™ cable.

One wide-spread use of an external peripheral data storage systems is for creating backups of data in the host system so to minimize the risk of a permanent loss or corruption of data due to a hardware or software damage to the host system. The backup operation may be a scheduled operation wherein the host system is configured to routinely backup data to the external peripheral data storage systems at pre-selected times, such as every midnight. In current products, however, even though a host system performs a scheduled backup operation to a external peripheral data storage system at a pre-selected time(s), the external peripheral data storage system is often kept in an ON state by a user at all times to reduce the occurrence of an OFF state of the external peripheral data storage system during a scheduled backup time, particularly if the backup is scheduled for a time when the user is unavailable to return the peripheral data storage system to an ON state. As such, the external peripheral data storage systems are left in an ON state for longer than necessary, resulting in inefficient power usage and reducing the overall longevity of the external peripheral data storage system.

Accordingly, what is needed is a method for facilitating the power cycling of a peripheral data storage system for performing of scheduled backup operations to peripheral data storage system.

SUMMARY OF THE INVENTION

This invention can be regarded as a method for remotely power cycling a peripheral data storage system from a host system. The method comprises powering-up the peripheral data storage system from the host system based on a host-scheduled backup operation; transmitting pre-selected data to the peripheral data storage system from the host system based on the host-scheduled backup operation; and powering-down the peripheral data storage system from the host system based on the host-scheduled backup operation.

This invention can also be regarded as a method of operating a peripheral data storage system for use with a host system configured to perform scheduled backup operations to the peripheral data storage system, the peripheral data storage system comprising a peripheral data storage device, a peripheral data storage system controller, and a peripheral data storage controller host interface adapted for communication with the host system. The method comprises powering-up the peripheral data storage system based on a host-scheduled backup operation; receiving data from the host system for storing in the peripheral data storage device; and powering-down the peripheral data storage system based on the host-scheduled backup operation.

DETAILED DESCRIPTION OF THE INVENTION

Figure 1:
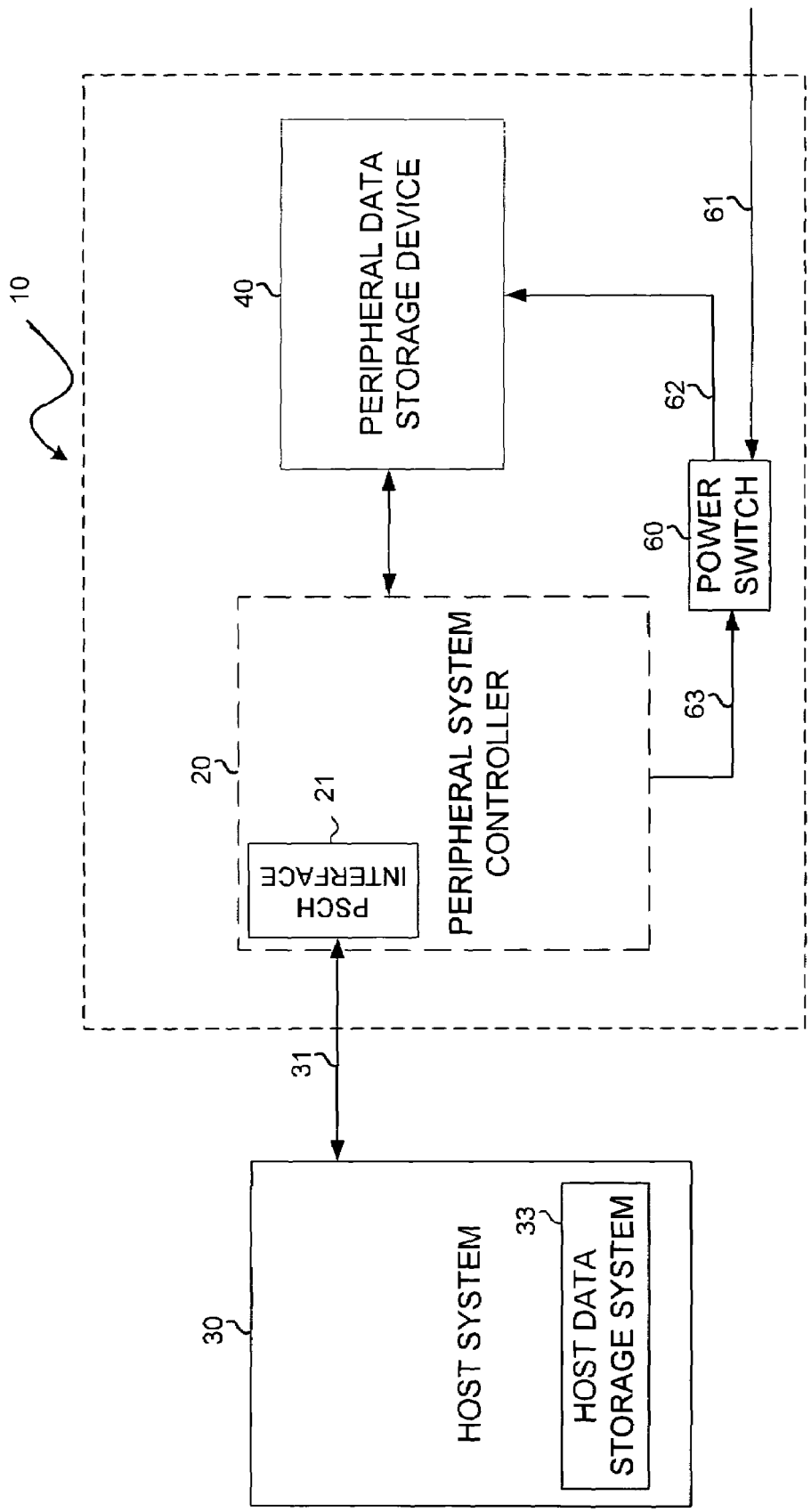
FIG. 1 illustrates an exemplary peripheral data storage system in which the embodiments of the present invention may be practiced.

With reference to FIG. 1, an exemplary peripheral data storage system 10 is shown in which the embodiments of the present invention for operating a peripheral data storage system 10 for use with a host system 30 configured to perform scheduled backup operations to the peripheral data storage system 10 may be practiced. As shown in FIG. 1, the peripheral data storage system 10, such as an external disk drive system, comprises a peripheral data storage device 40, such as a disk drive, a peripheral system controller 20, and a peripheral system controller host interface 21 adapted for communication with the host system 30 via the communication medium 31, such as a universal serial bus (USB) cable or a Firewire™ cable. Suitably, the peripheral data storage system controller 20 is a bridge controller and the peripheral data storage controller host interface 21 is a bridge controller host interface. During the operations of the data storage device 40, the peripheral system controller 20 transmits command 63 to the power switch 60 for providing the data storage device 40 with a DC operating current 62 inputted via line 61 from an external power source (not shown).

Figure 2A:
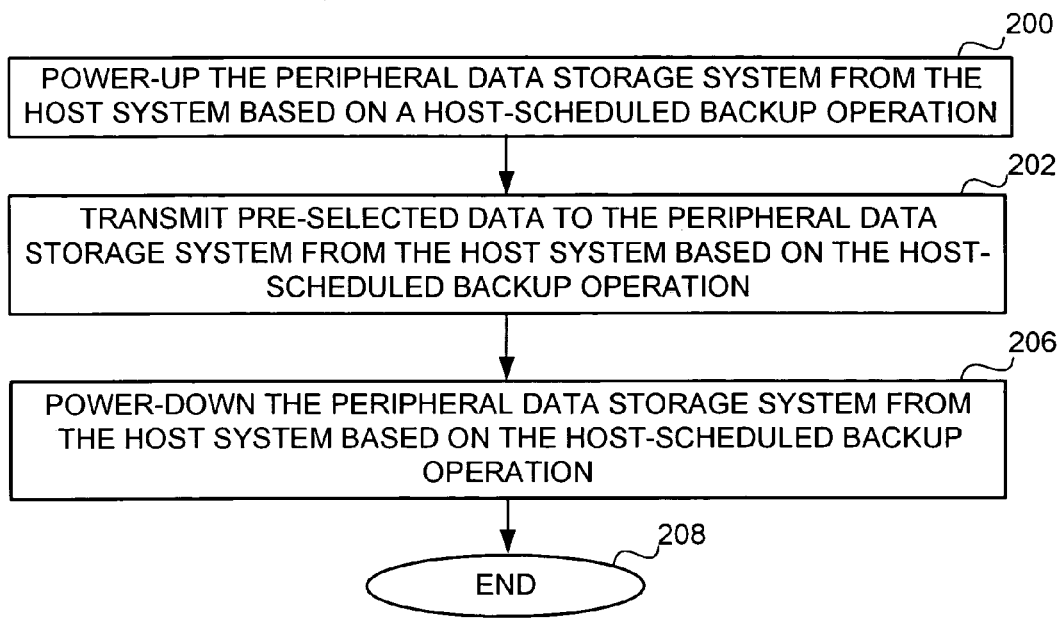
FIG. 2A-C are flow charts illustrating a method of the present invention used in the exemplary peripheral data storage system shown in FIG. 1.

FIG. 2A is a flow chart describing a process of the present invention for remotely power cycling the peripheral data storage system 10 from the host system 30 used in the exemplary peripheral data storage system 10 shown in FIG. 1. As shown in FIG. 2A. The process begins in block 200 in which the peripheral data storage system 10 is powered-up from the host system 30 based on a host-scheduled backup operation as described below and in greater detail in conjunction with FIG. 2B. Suitably, the powering-up is performed periodically at a pre-scheduled time corresponding to the host-scheduled backup operation, such as at every midnight. Suitably, the host-scheduled backup operation is configured in the host system 30 prior to the powering-up. Next, in block 202, the pre-selected data is transmitted to the peripheral data storage system 10 from the host system 30 based on the host-scheduled backup operation. Suitably, the host system 30 comprises a host data storage system 33 in which the pre-selected data resides. Suitably, a portion of host data is pre-selected during the configuring of the host system 30 prior to the powering-up for the host-scheduled backup operations of the selected portion to the peripheral data storage system 10. Next, in block 206, the peripheral data storage system 10 is powered-down from the host system 30 based on the host-scheduled backup operation as described below and in greater detail in conjunction with FIG. 2C. Suitably, the host system 30 determines if the transmitted pre-selected data were stored in the peripheral data storage system 10 prior to powering-down the peripheral storage system 10. The flow then proceeds to block 208 in which the overall process ends.

Figure 2B:
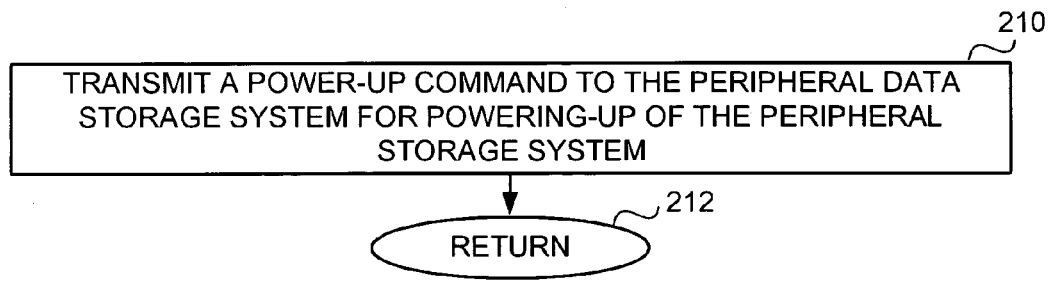

FIG. 2B describes in greater detail the powering-up process described in block 200 of FIG. 2A. As shown in FIG. 2B, the process begins in block 210 wherein a power-up command is transmitted from the host system 30 to the peripheral data storage system 10. In one exemplary embodiment, the power-up command causes the peripheral data storage system 10 to supply power to the peripheral data storage device 40 from an external power supply source (not shown). In another exemplary embodiment, the powering-up comprises powering-up the peripheral storage device 40 pursuant to the receipt of a power-up command transmitted from the host system 30. In this embodiment, the data storage system controller 20 (such as a bridge controller) remains in an ON state at all times in anticipation of the receipt of the power-up command for powering-up of the peripheral data storage device 40. The flow then proceeds to block 212 for returning to block 200 of FIG. 2A.

Figure 2C:
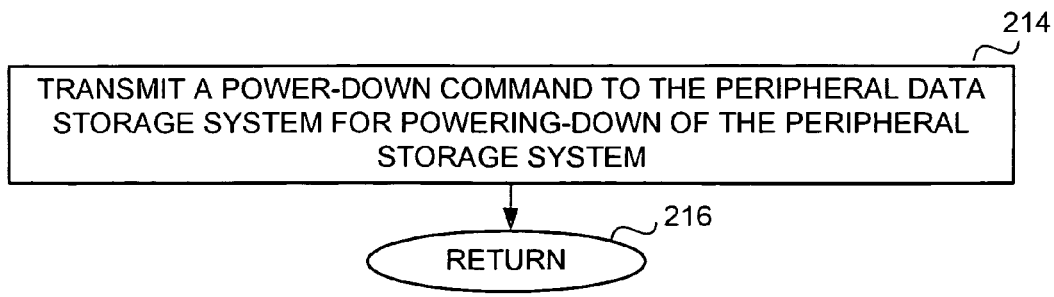

FIG. 2C describes in greater detail the powering down process described in block 206 of FIG. 2A. As shown in FIG. 2C, the process begins in block 214 wherein a power-down command is transmitted from the host system 30 to the peripheral data storage system 10. In one exemplary embodiment, the power-down command causes the peripheral data storage system 10 to cease supplying power to the peripheral data storage device 40 from an external power supply source (not shown). In another exemplary embodiment, the powering-down comprises powering-down the peripheral storage device 40 pursuant to the receipt of a power-down command transmitted from the host system 30. In this embodiment, the data storage system controller 20 (such as a bridge controller) remains in an ON state at all times in anticipation of the receipt of the power-down command for powering-down of the peripheral data storage device 40. The flow then proceeds to block 216 for returning to block 206 of FIG. 2A.

In another exemplary embodiment, the powering-up of block 200 is achieved by supplying operating power to the peripheral data storage system 10 from the host system 30 and the powering-down of block 206 is achieved by ceasing the supplying of operating power to the peripheral data storage system 10 from the host system 30.

Figure 3A:
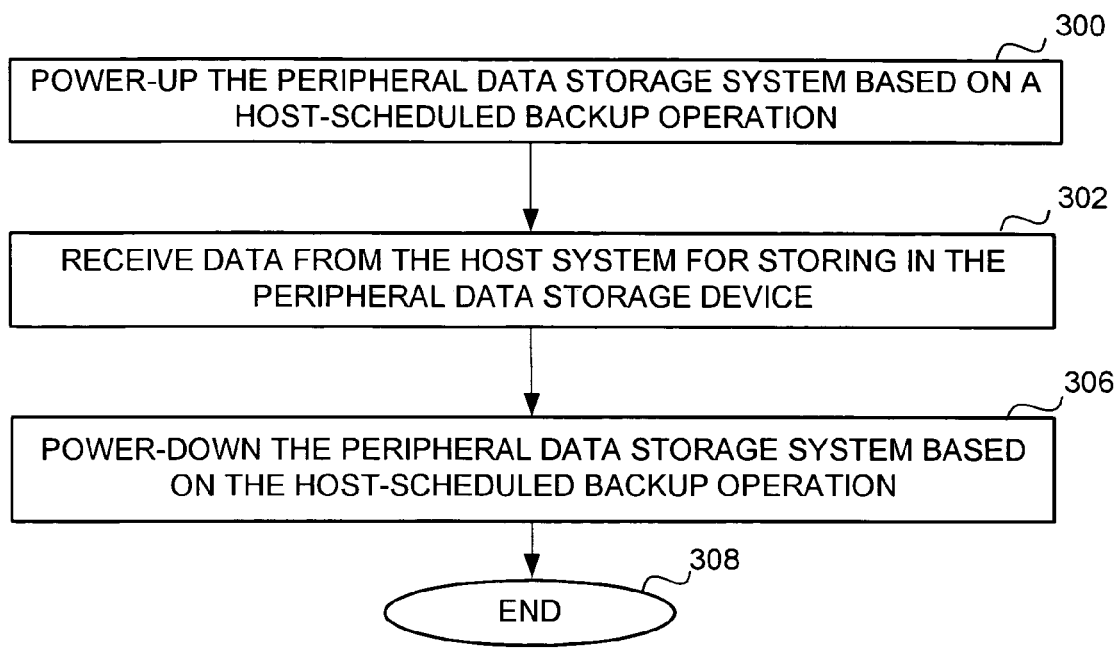
FIG. 3A-C are flow charts illustrating another method of the present invention used in the exemplary peripheral data storage system shown in FIG. 1.

FIG. 3A is a flow chart describing another process of the present invention for remotely power cycling the peripheral data storage system 10 from the host system 30 used in the exemplary peripheral data storage system shown in FIG. 1. As shown in FIG. 3A. The process begins in block 300 in which the peripheral data storage system 10 is powered-up from the host system 30 based on a host-scheduled backup operation as described below and in greater detail in conjunction with FIG. 3B. Suitably, the powering-up is performed periodically at a pre-scheduled time corresponding to the host-scheduled backup operation, such as at every midnight. Next, in block 302 data is received by the peripheral data storage system 10 from the host system 30 for storing in the peripheral data storage device 40. Next, in block 306, the peripheral data storage system 10 is powered-down based on the host-scheduled backup operation as described below in greater in conjunction with FIG. 3C. Suitably, the peripheral data storage system 10 determines if the received data were stored in the peripheral data storage system 10 prior to powering-down the peripheral storage system 10. The flow then proceeds to block 308 in which the overall process ends.

Figure 3B:
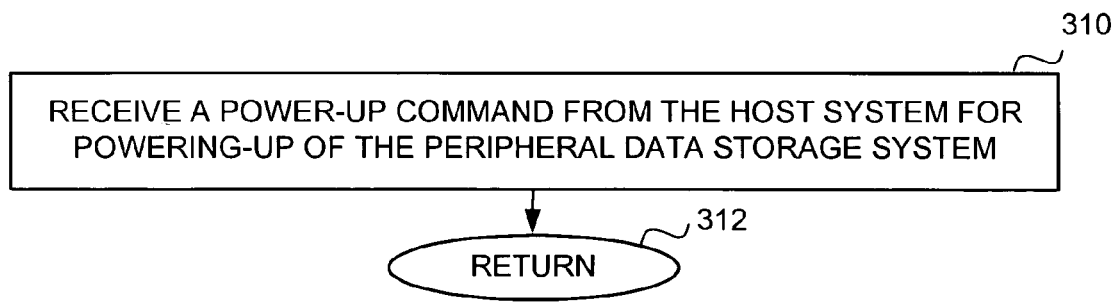

FIG. 3B describes in greater detail the powering-up process described in block 300 of FIG. 3A. As shown in FIG. 3B, the process begins in block 310 wherein a power-up command is received from the host system 30 for powering-up of the peripheral data storage system 10. In one exemplary embodiment, the power-up command causes the peripheral data storage system 10 to supply power to the peripheral data storage device 40 from an external power supply source (not shown). In another exemplary embodiment, the powering-up comprises powering-up the peripheral storage device 40 pursuant to the receipt of a power-up command from the host system 30. In this embodiment, the data storage system controller 20 (such as a bridge controller) remains in an ON state at all times in anticipation of the receipt of the power-up command for powering-up of the peripheral data storage device 40. The flow then proceeds to block 312 for returning to block 300 of FIG. 3A.

Figure 3C:
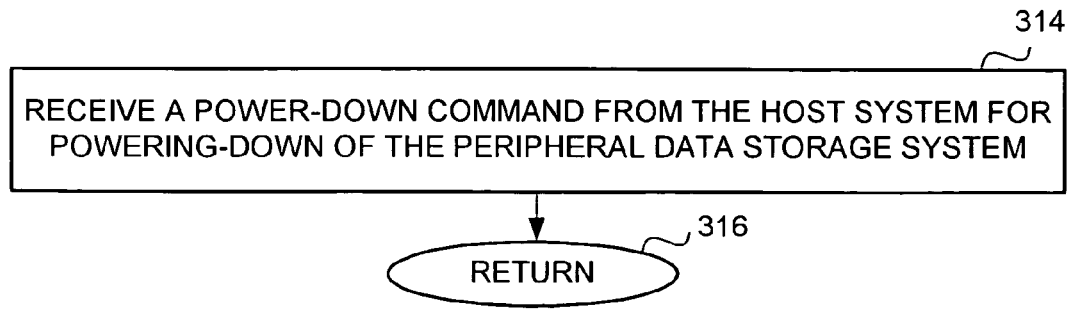

FIG. 3C describes in greater detail the powering down process described in block 306 of FIG. 3A. As shown in FIG. 3C, the process begins in block 314 wherein a power-down command is received from the host system 30 for powering-down of the peripheral data storage system 10. In one exemplary embodiment, the power-down command causes the peripheral data storage system 10 to cease supplying power to the peripheral data storage device 40 from an external power supply source (not shown). In another exemplary embodiment, the powering-down comprises powering-down the peripheral storage device 40 pursuant to the receipt of a power-down command from the host system 30. In this embodiment, the data storage system controller 20 (such as a bridge controller) remains in an ON state at all times in anticipation of the receipt of the power-down command for powering-down of the peripheral data storage device 40. The flow then proceeds to block 316 for returning to block 306 of FIG. 3A.

In other exemplary embodiments, the powering-up of block 300 may be achieved by receiving operating power from the host system 30 and the powering-down of block 306 is achieved by ceasing the receiving of operating power from the host system 30. Suitably, the powering-down of block 306 may also be achieved by a self-powering-down by the peripheral data storage system 10 after a predetermined timeout period following the storing of the data received from the host system 30.

One advantage of the foregoing feature of the present invention over the prior art is that by power cycling the peripheral data storage system 10 based on a host-scheduled backup operation, the need for leaving the peripheral data storage system 10 in an ON state at all times is minimized, thus reducing the associated inefficient power usage and the reduction in overall longevity of the external peripheral data storage system 10.

It should be noted that the various features of the foregoing embodiments were discussed separately for clarity of description only and they can be incorporated in whole or in part into a single embodiment of the invention having all or some of these features.

What is claimed is:

1. A method for remotely power cycling a peripheral data storage system from a host system, the method comprising:

scheduling a host-scheduled backup operation, wherein the host-scheduled backup operation comprises pre-selected data from the host for backup on the peripheral data storage system and a start time for the host-scheduled backup operation;

powering-up the peripheral data storage system from the host system at the start time based on the host-scheduled backup operation;

transmitting the pre-selected data to the peripheral data storage system from the host system based on the host-scheduled backup operation; and powering-down the peripheral data storage system from the host system upon completion of the host-scheduled backup operation.

2. The method of claim 1, wherein the powering-up is performed periodically at a pre-scheduled time corresponding to the host-scheduled backup operation.

3. The method of claim 1, wherein the powering-up further comprises:
transmitting a power-up command to the peripheral data storage system for powering-up of the peripheral storage system.

4. The method of claim 1, wherein the powering-down further comprises:
transmitting a power-down command to the peripheral data storage system for powering-down of the peripheral storage system.

5. The method of claim 1, wherein the powering-up further comprises:
supplying operating power to the peripheral data storage system from the host system.

6. The method of claim 5, wherein the powering-down further comprises:
ceasing the supplying of operating power to the peripheral data storage system from the host system.

7. The method of claim 1, wherein the powering-down further comprises:
determining if the transmitted pre-selected data were stored in the peripheral data storage system prior to the powering-down the peripheral storage system.

8. The method of claim 1, wherein the peripheral data storage system comprises a peripheral data storage device, a peripheral system controller, and a peripheral system controller host interface adapted for communication with the host system.

9. The method of claim 8, wherein the powering-up comprises powering-up the peripheral storage device.

10. The method of claim 8, wherein the powering-down comprises powering-down the peripheral storage device.

11. The method of claim 9, wherein the powering-up further comprises:
transmitting a power-up command to the peripheral data storage system for powering-up of the peripheral data storage device.

12. The method of claim 11, wherein the power-up command causes the peripheral data storage system to supply power to the peripheral data storage device from an external power supply source.

13. The method of claim 10, wherein the powering-down further comprises:
transmitting a power-down command to the peripheral data storage system for powering-down of the peripheral data storage device.

14. The method of claim 13, wherein the power-down command causes the peripheral data storage system to cease a supplying of power to the peripheral data storage device from an external power supply source.

15. The method of claim 8, wherein the peripheral data storage system comprises an external disk drive system and wherein the peripheral data storage device is a disk drive.

16. The method of claim 1, wherein the host system comprises a host data storage system and wherein the pre-selected data resides in the host data storage system.

17. The method of claim 1, further comprising: configuring the host-scheduled backup operation in the host system prior to the powering-up.

18. The method of claim 17, the configuring further comprising:
pre-selecting a portion of host data for the host-scheduled backup operations of the selected portion to the peripheral data storage system.

19. The method of claim 1, wherein the host system is adapted for communication with the peripheral data storage system via a universal serial bus (USB) cable.

20. A method of operating a peripheral data storage system for use with a host system configured to perform scheduled backup operations to the peripheral data storage system, the peripheral data storage system comprising a peripheral data storage device, a peripheral data storage system controller, and a peripheral data storage controller host interface adapted for communication with the host system, the method comprising:
powering-up the peripheral data storage system at a start time based on a host-scheduled backup operation, wherein the host-scheduled backup operation is scheduled by the host system and comprises pre-selected data from the host for backup on the peripheral data storage system and the start time for the host-scheduled backup operation;
receiving the pre-selected data from the host system for storing in the peripheral data storage device; and
powering-down the peripheral data storage system upon completion of the host-scheduled backup operation.

21. The method of claim 20, wherein the powering-up is performed periodically at a pre-scheduled time corresponding to the host-scheduled backup operation.

22. The method of claim 20, wherein the powering-up further comprises:
receiving a power-up command from the host system for powering-up of the peripheral data storage system.

23. The method of claim 20, wherein the powering-down further comprises:
receiving a power-down command from the host system for powering-down of the peripheral data storage system.

24. The method of claim 20, wherein the powering-up further comprises:
receiving operating power from the host system.

25. The method of claim 24, wherein the powering-down further comprises:
ceasing the receiving of operating power from the host system.

26. The method of claim 20, wherein the powering-down further comprises:
determining if the received data were stored in the peripheral data storage device prior to the powering-down the peripheral data storage system.

27. The method of claim 20, wherein the powering-up comprises powering-up the peripheral data storage device.

28. The method of claim 27, wherein the powering-down comprises powering-down the peripheral data storage device.

29. The method of claim 27, wherein the powering-up further comprises:
receiving a power-up command from the host system for powering-up of the peripheral data storage device.

30. The method of claim 29, wherein the power-up command causes the peripheral data storage system to supply power to the peripheral data storage device from an external power supply source.

31. The method of claim 26, wherein the powering-down further comprises:
receiving a power-down command from the host system for powering-down of the peripheral data storage device.

32. The method of claim 31, wherein the power-down command causes the peripheral data storage system to cease a supplying of power to the peripheral data storage device from an external power supply source.

33. The method of claim 20, wherein the peripheral data storage system comprises an external disk drive system and wherein the peripheral data storage device is a disk drive.

34. The method of claim 20, wherein the peripheral data storage controller host interface is adapted for communication with the host system via a universal serial bus (USB) cable.

35. The method of claim 20, wherein the peripheral data storage system controller is a bridge controller and wherein the peripheral data storage controller host interface is a bridge controller host interface.

36. A method for remotely power cycling a peripheral data storage system from a host system, the host system comprising a disk drive, the method comprising:
scheduling a host-scheduled backup operation, wherein the host-scheduled backup operation comprises pre-selected data from the host for backup on the peripheral data storage system and a start time for the host-scheduled backup operation;
powering-up the peripheral data storage system from the host system at the start time based on a host-scheduled backup operation;
transmitting the pre-selected data to the peripheral data storage system from the disk drive of the host system based on the host-scheduled backup operation; and
powering-down the peripheral data storage system from the host system upon completion of the host-scheduled backup operation.

37. A method of operating a peripheral data storage system for use with a host system comprising a disk drive, the host system configured to perform scheduled backup operation from the disk drive to the peripheral data storage system, the peripheral data storage system comprising a peripheral data storage device, a peripheral data storage system controller, and a peripheral data storage controller host interface adapted for communication with the host system, the method comprising:
powering-up the peripheral data storage system at a start time based on a host-scheduled backup operation, wherein the host-scheduled backup operation is scheduled by the host system and comprises pre-selected data from the host for backup on the peripheral data storage system and the start time for the host-scheduled backup operation;
receiving the pre-selected data from the disk drive of the host system for storing in the peripheral data storage device; and
powering-down the peripheral data storage system upon completion of the host-scheduled backup operation.

* * * * *